Feb. 12, 1935.    W. BARBER    1,990,890
BRAKE DRUM
Filed Sept. 2, 1932
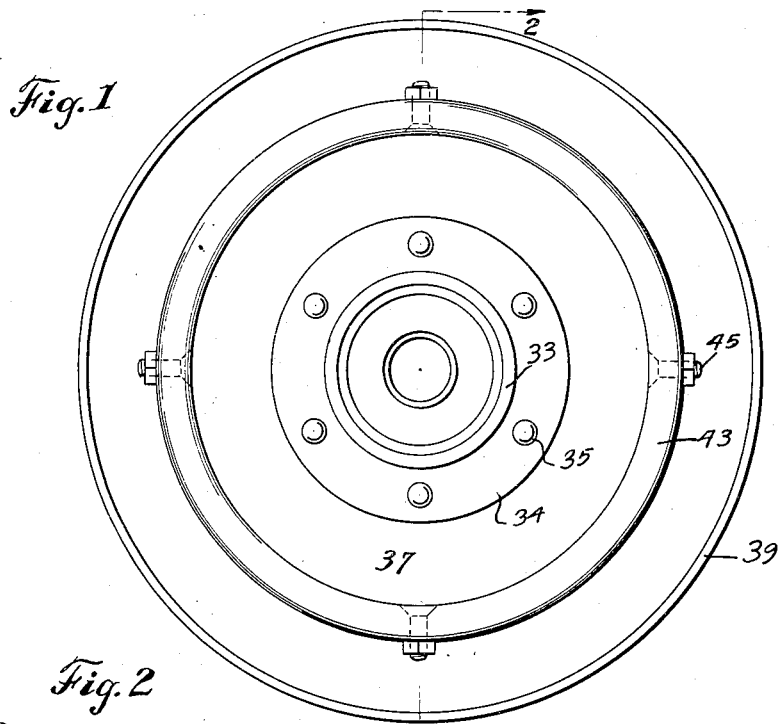
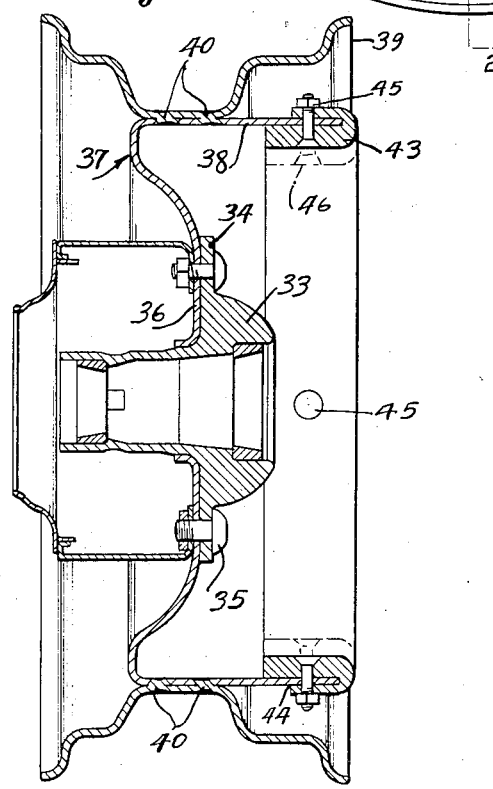
INVENTOR
William Barber
BY
ATTORNEY Patented Feb. 12, 1935

1,990,890

UNITED STATES PATENT OFFICE 1,990,890

BRAKE DRUM

William Barber, Brooklyn, N. Y.

Application September 2, 1932, Serial No. 631,458

2 Claims. (Cl. 188—218)

This invention relates to improvements in brake drum wheels for automobiles.

The object of this invention is to provide an automobile wheel in which the disc is displaced by the brake drum, to which is attached the tire rim.

Another object of my present invention is to provide an automobile brake drum the disc portion of which is formed in such a manner as to create a suction, of air, towards the brake drum thereby producing a cooling means therefor.

A still further object is to provide a brake drum, for automobiles, having an easily detachable brake shoe of standard size which may be made of any of the various materials such as:— metal, hard wood, asbestos or any of the suitable compositions.

Another object of my invention is to provide a brake shoe of various degrees of thickness, that is, while the outer diameter remains the same on all, the inner diameters of some are less than others, so as to fit the various makes of cars.

This invention consists substantially in the construction, combination, location and relative arrangement of parts, all as will be more fully hereinafter set forth, as shown in the accompanying drawing, and finally pointed out in the appended claims.

Referring to the drawing

Figure 1 is a side elevational view, looking into the drum, of my device

Figure 2 is a sectional view taken on line 2—2 of Figure 1.

While in the drawing I have illustrated a specific embodiment of the invention, it will, of course, be understood that minor changes and variations in the particular construction shown, and the embodiment of the invention in other forms, as will appeal to those skilled in the art, and falling within the scope of the appended claims, may be practical without departing from the spirit of the invention.

Referring now specifically to the drawing, 33 shows the hub of the wheel having the flange portion 34. To the flange 34 of said hub is secured, by means of bolts 35, the disc portion 36 of the brake drum 37, having a flange 38.

To the flange portion 38 of the brake drum 37 is secured the tire rim 39, by means of spot welds 40.

The brake shoe 43 is provided with an annular groove 44, into which projects the free edge of the flange 38 of the brake drum 37. The brake shoe 43 which may be made in various thicknesses, as shown at 46, is secured to said flange 38 by means of the bolts 45.

In operation, the brake shoe is forced over the flange portion of the brake drum and secured by means of the bolts as shown in the drawing. When the brake shoe becomes worn, or otherwise defective it is only necessary to unloosen the screws and remove and replace it with a new one. The entire operation requiring only a short time. The shoes are to be made in standard sizes and so as to fit the various makes of automobiles.

From the foregoing description it will be seen that I provide an exceedingly simple, but highly efficient, brake shoe which may be readily mounted and demounted to and from the brake drum without disturbing any parts of the wheel whatsoever.

Having thus described my invention, what I claim as new and desire to protect by Letters Patent is:

1. A vehicle wheel comprising a central hub, a disc attached to said hub and having an integral annular flange at its periphery, a rim secured to said disc at the flange, and a brake shoe having a groove therein in which the annular edge of the flange fits.

2. A vehicle wheel comprising a central hub, a disc attached to said hub and having an integral annular flange at its periphery, a rim secured to said disc at the flange, a ring shaped brake shoe having a circular groove into which the edge of the flange fits, and means to secure the shoe on the flange.

WILLIAM BARBER.